United States Patent [19]

McKenzie

[11] Patent Number: 4,983,979
[45] Date of Patent: Jan. 8, 1991

[54] RADAR DETECTION OF TARGETS AT SHORT AND LONG RANGE

[75] Inventor: Jennifer A. H. McKenzie, Ottawa, Canada

[73] Assignee: Canadian Marconi Company, Montreal, Canada

[21] Appl. No.: 329,886

[22] Filed: Mar. 28, 1989

[51] Int. Cl.⁵ .......................................... G01S 13/38
[52] U.S. Cl. ................................ 342/204; 342/201; 342/131; 342/132
[58] Field of Search ............... 342/204, 131, 132, 145, 342/189, 201, 137

[56] References Cited

U.S. PATENT DOCUMENTS

| | | | |
|---|---|---|---|
| 3,852,746 | 12/1974 | Lowenschuss et al. | 342/201 |
| 3,860,926 | 1/1975 | Gillmer | 342/132 |
| 3,887,918 | 6/1975 | Bailey et al. | 342/189 |
| 4,096,478 | 6/1978 | Chavez | 342/132 |
| 4,136,341 | 1/1979 | Mulder et al. | 342/160 |
| 4,153,900 | 5/1979 | Novak et al. | 342/201 |
| 4,404,562 | 9/1983 | Kretschmer, Jr. et al. | 342/194 |
| 4,490,720 | 12/1984 | Kuntman | 342/195 |
| 4,521,779 | 6/1985 | Lewis | 342/194 |
| 4,524,361 | 6/1985 | Teulings | 342/201 |
| 4,524,362 | 6/1985 | Lewis | 342/201 |
| 4,524,363 | 6/1985 | Kretschmer | 342/201 |
| 4,542,382 | 9/1985 | Hol | 342/91 |
| 4,560,961 | 12/1985 | Kestenbaum | 342/201 |
| 4,562,438 | 12/1985 | Rouse et al. | 342/201 |
| 4,573,050 | 2/1986 | Waters | 342/372 |
| 4,626,853 | 12/1986 | Lee et al. | 342/132 |
| 4,626,855 | 12/1986 | Rouse | 342/201 |
| 4,670,755 | 6/1987 | Gellekink et al. | 342/194 |
| 4,733,237 | 3/1988 | Apostolos et al. | 342/13 |

*Primary Examiner*—Thomas H. Tarcza
*Assistant Examiner*—John B. Sotomayor
*Attorney, Agent, or Firm*—Fishman, Dionne & Cantor

[57] ABSTRACT

A transmitting channel includes a pulse generator unit for generating frequency or phase code modulated pulses having a common centre frequency. The pulses are transformed to a transmitting frequency in the transmitting channel. An antenna, which is connected to the output of the transmitting channel, radiates the transformed frequency pulses and receives return signals. A receiver channel processes the return signals. The receiver channel includes a pulse compressor unit for compressing the return signals. Each pulse to be transmitted consists of two or more sub pulses, at least one of the sub pulses being substantially longer than at least another one of the sub pulses. Each sub pulse is coded with a different compression code. The compression code of each sub pulse having a low cross-correlation property with the compression codes of all other sub pulses, all sub pulses having the same center frequency.

7 Claims, 2 Drawing Sheets

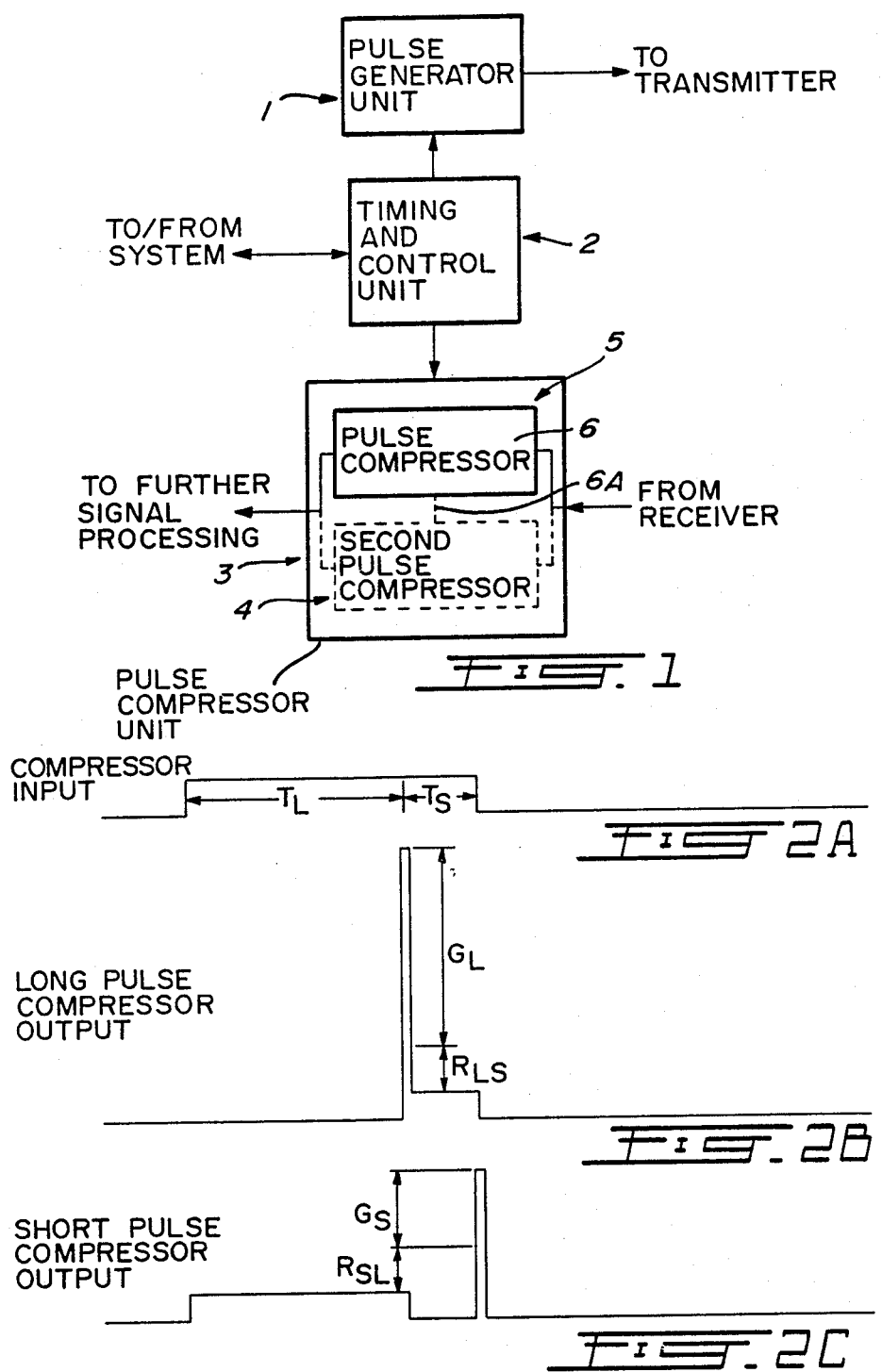

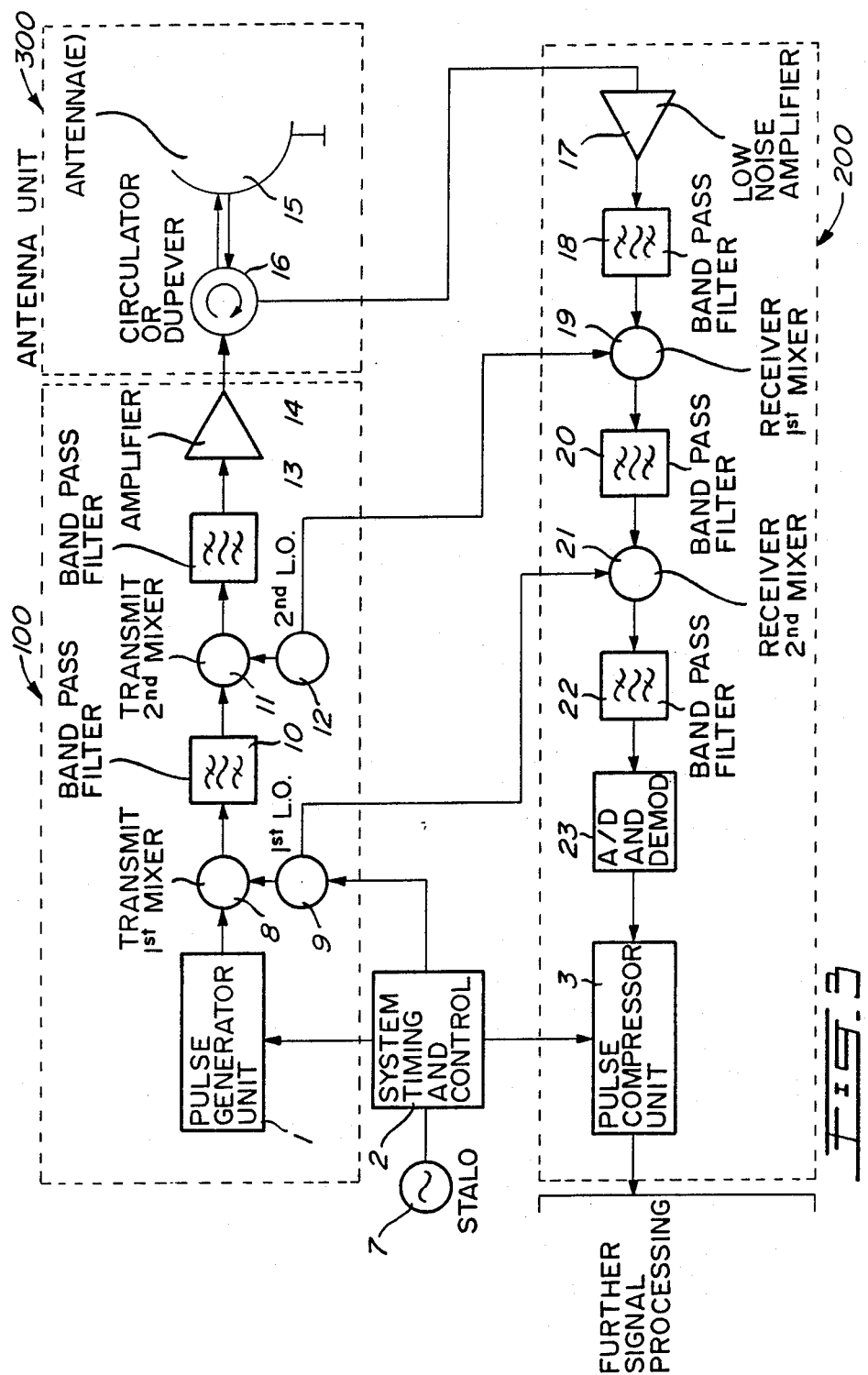

RADAR DETECTION OF TARGETS AT SHORT AND LONG RANGE

BACKGROUND OF THE INVENTION

1. Field of the Invention

The invention relates to a pulse compression system. More specifically, the invention relates to such a system which includes a generator for generating for transmission, frequency or phase modulated pulses, each pulse consisting of two or more sub pulses each of which is modulated by a different pulse compression code for detecting targets at short range and long range, the compression codes having low cross-correlation properties, the sub pulses having the same centre frequency, one of the sub pulses being substantially longer than the other sub pulse.

2. Description of Prior Art

Traditionally, because of limited peak transmission power, pulse compression systems with relatively high compression ratios, and therefore long frequency or phase modulated pulses, have been used for long range detection in radar systems. The pulse compression code allows the range resolution performance of a short pulse to be retained; however, these systems are limited in their ability to detect targets at short ranges since the radar is usually unable to receive the reflected pulse until transmission has ceased. To overcome this limitation, a system described in U.S. Pat. No. 4,136,341, Mulder et al, Jan. 23, 1979, was introduced in which a second pulse is generated and the two different pulses are transmitted. While the first pulse is phase or frequency modulated, the second pulse is not modulated and its length is optimized to ensure adequate detection at range not covered by the long modulated pulse. The two pulses are separated in frequency (centre frequency of the modulated pulses) to ensure isolation and thus two separate channels and a combiner are required in the transmitter; and a splitter and two separate paths are required in the receiver. A second variation of this system is described in U.S. Pat. No. 4,524,361, Teulings, June 18, 1985, which modulates the short pulse for improved range resolution at the shorter ranges. The centre frequencies of the two modulated pulses are still different to ensure isolation of one pulse from the other in the receiver channel.

The prior art has further teachings relating to pulse compression systems as, for example, in U.S. Pat. Nos. 3,852,746, Lowenschuss et al, Dec. 3, 1974; 3,860,926, Gillmer, Jan. 14, 1975; 4,096,478, Chavez, June 20, 1978; 4,153,900, Novak et al, May 8, 1979; 4,404,562, Kretschmer, Jr. et al, Sept. 13, 1983; 4,490,720, Kuntman, Dec. 25, 1984; 4,521,779, Lewis, June 4, 1985; 4,524,362, Lewis, June 18, 1985; 4,524,363, Kretschmer, June 18, 1985; 4,560,961, Kestenbaum, Dec. 24, 1985; 4,626,853, Lee et al, Dec. 2, 1986.

The '746 patent teaches an apparatus for generating a modulation signal in the transmitter of a pulse compression system, and specifically, a chirp modulation signal. The '926 patent relates to improved expansion and compression devices for transmitter pulses and receiver pulses of pulse compression systems.

The '478 patent teaches an MTI pulse compression system wherein two side by side pulses of equal length (see FIG. 2b of the patent) are transmitted. The first pulse is compression coded with an up chirp and the second pulse is compression coded with a down chirp. However, because the pulses are of equal length, the system in the '478 patent can be used only for a single range. In addition, the compressed pulses are substracted in the I.F. differencer (28 or FIG. 1 of the patent).

The '900 patent discloses two complimentary phase-coded signals which are synchronously transmitted in a pulse compression system such that, the two autocorrelation functions, when combined, are mutually cancelling except at the synchronous occurrence of the maxima of the autocorrelation functions. A doppler tolerant pulse compression system is described in the '562 patent. An analog-type linear FM modulated transmission pulse is used, and its echo is processed by baseband sampling at the Nyquist sampling rate and then converted to IF.

The '720 patent relates to a radar system where long and short pulses are alternately transmitted. However, this system does not use pulse compression techniques.

The '779 patent relates to a decoder for a pulse compression system. Both the '362 and '863 patents teach pulse compression systems using a fast Fourier transform circuit in a matched filter. In the '961 patent, a system for generating continuous waves useful in pulse compression systems is described. In the '853 patent, a processor for a pulse compression signal useful in a pulse compression system is described. The object of the processor is to enhance the resolvability of the returns.

SUMMARY OF INVENTION

The primary objective of the invention is to provide a radar pulse compression system which has good target detection at both long range and relatively short range using minimal hardware for savings in cost and complexity.

This objective is met by generating, transmitting, receiving and compressing two or more frequency or phase coded pulses at the same centre frequency as one another. The pulses are coded with pulse compression waveforms; however, one pulse is substantially longer than the other. The longer pulse contains more energy for detection of targets at long range. The shorter pulse is coded for optimal target detection at shorter ranges. The pulse compression codes are designed with low cross correlation properties so that the matched filter or compressor corresponding to each code decorrelates or rejects the other.

These two or more pulses may be generated contiguously in time so that they form one long pulse comprised of the two or more sub pulses or they may be transmitted separately in any sequence, as dictated by the radar system requirements. It is expected that the most commonly used method will be to transmit two sub pulses in immediate succession, the first one being the longer pulse used for long range detection followed by the shorter pulse for close in target detection. This configuration is used when a general search of all ranges is required since the short sub pulse is received as soon as possible after it is transmitted, covering as short a range as possible.

In accordance with an embodiment of the invention there is provided a pulse compression system. The system includes a transmitting channel including means for generating frequency or phase code modulated pulses having a centre frequency, and means for transforming the pulses to a desired transmitting frequency. Means are provided for radiating the transformed frequency pulses and for receiving return signals. A receiver channel means is provided for processing the return signals, the receiver channel including a pulse compressor unit for compressing said return signals. Each pulse to be transmitted comprises two or more sub pulses. At least one of the sub pulses is substantially longer than at least another one of the sub pulses, each sub pulse being coded with a different compression code. The compression code of each sub pulse has a low cross-correlation property with the compression codes of all other sub pulses. The sub pulses have the same centre frequency.

BRIEF DESCRIPTION OF THE DRAWINGS

The invention will be better understood by an examination of the following description, together with the accompanying drawings, in which:

FIG. 1 illustrates a pulse compression system in block diagram form in accordance with the invention;

FIGS. 2A 2B and 2C illustrate the relationships between the waveforms at the inputs and outputs of the Pulse Compression Unit; and FIG. 3 illustrates, in schematic form, a pulse compression radar system using the inventive pulse compression system.

DESCRIPTION OF PREFERRED EMBODIMENTS

Referring to FIG. 1, the pulse compression system comprises a pulse generator unit 1, a timing and control unit 2 and pulse compressor means 3. The pulse generator generates two sub pulses, which, as above mentioned, can be contiguous to one another. Each of the sub pulses is frequency or phase modulated about a centre frequency, and each sub pulse is coded with a different compression code, the different compression code of each pulse having a low cross-correlation property to the compression codes of every other sub pulses. All sub pulses have the same centre frequency.

The pulses, as will be seen below, are transmitted to the antenna for radiation.

The generated transmit pulses are coherent with the clock system which is accomplished by timing signals provided by the timing and control unit 2. The transmit pulse is produced in the pulse generator unit, either by generating the in-phase and quadrature components of the complex waveform at baseband and modulating with an IF carrier, or by generating directly at IF. Techniques for accomplishing waveform generation of this type are well known in the prior art relating to radar systems.

The pulse compression codes of each of the sub pulses are designed such that the compression code for each sub pulse decorrelates or suppresses the other codes. The pulse compression means 3 may contain a single pulse compressor unit with two or more sets of coefficients, wherein one set of coefficients will correlate with the compression code of one of the pulses and will decorrelate with the compression codes of the other sub pulses, and other sets of coefficients will correlate with the compression codes of the other sub pulses and will decorrelate with the compression code of the one sub pulse. A switch means, illustrated schematically at 6, will switch in one set of coefficients at a time. The first set of coefficients will be switched in at the time that a pulse is transmitted and will stay switched in for a time equal to the maximum range of the short range pulse. The second set of coefficients will then be switched in until the next pulse is transmitted.

If two or more pulse compressor units are used, then one of the pulse compressor units will have coefficients which correlate with the compression code of one of the sub pulses but which decorrelate with the other ones of the sub pulses. Another pulse compressor unit will have coefficients which correlate with another one of the sub pulses but decorrelate with the remainder of the sub pulses, etc. In the illustrated embodiment, there are two compressor units indicating two sub pulses. One or the other pulse compressor units will be switched into circuit by a switch illustrated schematically at 6A. Alternatively, both compressor units can be switched on at all times.

FIG. 2A illustrates the composition of a transmitted pulse when each pulse consists of only two sub pulses. This transmitted pulse will also appear at the input of the pulse compressor means 3. As seen in FIG. 2A, the pulse consists of a long pulse $T_l$ and a short pulse $T_s$. The two pulses, as shown in the FIG. 2A, are contiguous. However, they may be spaced from each other. In either case, the short pulse will follow the long pulse.

The Ratio $T_l/T_s$ may vary from 2/1 to 100/1 but is typically 10/1. Typically $T_l$ will be 100 microseconds long and $T_s$ will be 10 microseconds long.

When the composite pulse, shown in FIG. 2A, is processed by a pulse compressor having the coefficients of the longer sub pulse, the output, as shown in FIG. 2B, contains the compressed pulse corresponding to the correlation of the long sub pulse with the long sub pulse coefficients, and the interference introduced by the presence of the shorter sub pulse. This interference is suppressed relative to the compressed pulse by the compression gain, $G_l$ plus the short sub pulse rejection, $R_{ls}$. Similarly, the output of the compressor having the coefficients of the shorter sub pulse, shown in FIG. 2C, contains the compresse pulse corresponding to the correlation to the short sub pulse with the short sub pulse coefficients as well as interference introduced by the longer sub pulse which is suppressed relative to the compressed sub pulse by $G_s$ plus $R_{sl}$.

A well known example of two mutually exclusive compression codes, which can be used in the system of the present invention, is a linear FM coding where an up chirp is used for one sub pulse and a down chirp is used for the other sub pulse. The compression coefficients in the pulse compressor for each sub pulse may or may not have weighting by a window for range side lobe suppression, standard practice in linear FM pulse compression design.

Although the invention is herein illustrated with a two sub pulse generator, it is conceivable that more than two sub pulses would be desirable. For example, if a third, longer range were to be added, a third sub pulse would be used. The third sub pulse would be substantially longer than the first sub pulse ($T_l$) and would precede $T_l$. It would have the same centre frequency as the first two sub pulses and its compression code would have low cross-correlation properties with the compression codes of the first and second sub pulses.

A preferred embodiment of the invention is illustrated in FIG. 3. Turning to FIG. 3, it can be seen that the preferred embodiment includes the pulse generator unit 1, the system timing and control unit 2 and the pulse compressor unit 3.

FIG. 3 also illustrates a stable oscillator 7 for driving the system timing and control unit.

Pulse generator unit 1 is in the transmit channel which includes the pulse generator unit 1 as well as means for transforming the frequency of the generated pulses to a desired transmitting frequency. Such means include a first mixer 8, having one input ted from the pulse generator unit 1 and a second input fed from a first local oscillator 9. The output of the first mixer 8 is fed to a bandpass filter 10 which passes only the desired product of the mixer 8 output. The output of the first bandpass filter 10 is connected to a second mixer 11 whose second output is fed from a second local oscillator 12. The output of the second mixer 11 is fed to a second bandpass filter 13 which, once again, passes only the desired products of the second mixer 11. The ouput of the bandpass filter 13 is fed through an R.F. amplifier 14.

The output of the transmit channel is fed to an antenna unit 300 which includes antenna 15 and circulator or duplexer 16. The output of amplifier 14 is fed to the circulator for transmission to the antenna for radiation through space. As is well known, the circulator or duplexer 16 will pass signals from the transmit channel to the antenna 15 for such radiation, and will pass signals from the antenna 15 to the receive channel 200 for processing.

For the latter purpose, the circulator or duplexer 16 is connected to a low noise amplifier 17 whose output is connected to a third bandpass filter 18 to remove any undesired out of band effects. The output of the third bandpass filter 18 is fed to a third mixer 19 whose other output may be fed from the second local oscillator 12, or from a local oscillator at a different frequency as dictated by the requirements of further processing elements in the receiver channel 200. The output of the third mixer 19 is fed to a fourth bandpass filter 20 to eliminate any undesired out of band frequencies. The output of the fourth bandpass filter 20 is fed to a fourth mixer 21 whose second input is fed from the first local oscillator 9. Once again, a local oscillator of a different frequency could be used.

The output of the fourth mixer 21 is fed to a fifth bandpass filter 22 whose output is fed to an analogue-to-digital converter and demodulator 23. The output of 23 is fed to pulse compressor unit 3 where it is processed as discussed with respect to FIG. 2 above. The output of the receive channel 200 is then fed to further processing elements of the radar for further signal processing as required.

The timing and control unit, item 2, provides the timing signals to the pulse generator unit 1, so that the pulses can be transmitted at the desired pulse repetition frequencies (PRFs) and may be maintained coherent with the system clock. The pulse compressor unit 3, also receives signals from the timing and control unit 2 to co-ordinate the timing of the compression process with the rest of the system as above described. The timing and control unit 2 may comprise several separate units in any particular radar system, each responsible for the control of a different area of the radar. Only the functions required to control the pulse compression system are described here.

The transmit pulses originate in the timing and control unit 1. The pulses may be produced either by generating the component in-phase and quadrature signals at baseband and then modulating the carrier signal, or the modulated IF carrier may be generated directly. In either case, the output of the pulse generator unit 1 is a carrier signal modulated by the pulse compression code of the long and/or the short sub pulses as appropriate. The modulated signal is then mixed to the final transmit frequency by two mixer stages 8 and 11. The carrier frequency at the output of each mixer is determined by the centre frequency of the input signal and the frequencies of the local oscillators 9 and 12 respectively. Each mixer is followed by a bandpass filter stage 10 and 13 respectively which suppress all but the desired mixer sidebands for transmission. The signal is then amplified and transmitted through the antenna unit 300. The antenna unit 300 may comprise both a transmitting and a receiving antenna or may comprise one antenna with a circulator or duplexer 16 or some other suitable duplexing system. A single antenna 15 with a circulator or duplexer 16 to separate and isolate the transmit and receive signals is shown in FIG. 3.

In the described embodiments the pulse compression is performed digitally. A digital pulse compressor will normally require separate in-phase and quadrature digital inputs. A different assumption will dictate a different A/D, demodulator combination. The A/D conversion may be done before the demodulation in which case the centre frequency of the signal at the mixer output will be dictated by the speed of the A/D converter.

In operation, a pulse generated by the pulse generator unit 1 is transformed to the desired radiation frequency and radiated by the antenna. Returned signals will be processed in the receive channel 200 which, during the period of the short range, will include either a pulse compressor, (in the case of two compressors), or a pulse compressor (in the case of a single pulse compressor unit), which has in use the coefficients which correlate with the compression on the short range sub pulse. Following the short range period and until the end of a long range period, the pulse compressor unit 3 will have either a pulse compressor (in the case of two pulse compressors), or a pulse compressor (in the case of a single pulse compressor) which has in use the coefficients which correlate with the compression code of a long range sub pulse.

Although the compression system has been described in a radar environment, it could also be used in other environments.

Although a single embodiment has been described, this was for the purpose of illustrating, but not limiting, the invention. Various modifications, which will come readily to the mind of one skilled in the art, are within the scope of the invention as defined in the appended claims.

I claim:

1. A pulse compression system, comprising:
    a transmitting channel including means for generating frequency or phase code modulated pulses having a centre frequency, and means for transforming said pulses to a desired transmitting frequency;
    means for radiating said transformed frequency pulses and for receiving return signals; and
    a single receiver channel means for processing said return signals, said receiver channel means comprising a single serially arranged bandpass filter means;
    a pulse compression means, for compressing said return signals, following said single receiver channel means and being in series arrangement therewith;
    wherein each said pulse to be transmitted comprises two sub pulses, one of said sub pulses being substantially longer than the other one of said sub pulses, each sub pulse being coded with a different compression code, the compression code of the one sub pulse code having a low correlation property with the compression code of the other sub pulse, both said sub pulses having the same centre frequency;

whereby said bandpass filter means has a bandpass sufficient to pass both said sub pulses;

said pulse compression means comprising two compressor units, one of said pulse compressor units having coefficients which correlate with said one of said sub pulses and hwich decorrelate with said other one of said sub pulses, the other one of said pulse compressor units having coefficients which correlate with said other one of said sub pulses and which decorrelate with said one of said sub pulses; and means for switching said units into circuit one at a time, whereby, each unit is serially connected to said single receiver channel one at a time.

2. A system as defined in claim 1 wherein said transmit channel has at least one mixer, one bandpass filter and one local oscillator.

3. A system as defined in claim 2 wherein said receiver channel has at least one mixer, one local oscillator and said bandpass filter means.

4. A system as defined in claim 3 and further including a system timing and control unit.

5. A system as defined in claim 4 wherein said means for generating frequency or phase code modulated pulses comprises a pulse generator unit having an output and a control input;

(A) and wherein said transmitting channel further comprises:
  a first mixer having a first input, a second input and an output, and means connecting said output of said pulse generator unit to said first input of said first mixer;
  a first local oscillator having a first output a second output and a control input, means connecting said first output of said first local oscillator to said second input of said first mixer;
  a first bandpass filter having an input and an output, means connecting said output of said first mixer to said input of said bandpass filter;
  a second mixer having a first input, a second input and an output, means connecting said output of said first bandpass filter to said first input of said second mixer;
  a second local oscillator having a first output and a second output, means connecting said first output of said second local oscillator to said second input of said second mixer;
  a second bandpass filter having an input and an output, means connecting said output of said second mixer to said input of said second bandpass filter;

(B) said antenna means comprising:
  a duplexer means having a first input, a second input, a first output and a second output, means connecting said output of said second bandpass filter to said first input of said duplexer means;
  an antenna having a first input and a first output, means connecting said first output of said duplexer means to said input of said antenna, means connecting said outpu of said antenna to said second input of said duplexer means;

(C) said receiver channel means comprising:
  a low noise amplifier having an input and an output, means connecting said second output of said output, means connecting said second output of said duplexer means to said input of said low noise amplifier;
  a third bandpass filter having an input and an output, means connecting said input of said third bandpass filter to said output of said low noise amplifier;
  a third mixer having a first input, a second input and an output, means connecting said output of said third bandpass filter to said first input of said third mixer, means connecting said second output of said second local oscillator to said second input of said third mixer;
  a fourth bandpass filter having an input and an output, means connecting said output of said third mixer to said input of said fourth bandpass filter;
  a fourth mixer having a first input, a second input and an output, means connecting said output of said fourth bandpass filter to said first input of said fourth mixer, means connecting said second output of said first local oscillator to said second input of said fourth mixer;
  a fifth bandpass filter having an input and an output, means connecting said output of said fourth mixer to said input of said fifth bandpass filter;
  analogue-to-digital converter and demodulator means having an input and an output, means connecting said output of said fifth bandpass filter to said input of said analogue-to-digital converter and demodulator means;
  a pulse compressor unit having an input and a control input, means connecting said output of said analogue-to-digital converter and demodulator means to said input of said pulse compressor unit;

(D) said system timing and control unit comprising:
  a system timer and controller having a first output, a second output and a third output, said first output of said system timer and controller being connected to the control input of said pulse generator unit, said second output of said system timer and controller being connected to the control input of said first local oscillator, and said third output of said system timer and controller being connected to the control input of said pulse compressor unit.

6. A pulse compression system, comprising:
a transmitting channel including means for generating frequency or phase code modulated pulses having a centre frequency, and means for transforming said pulses to a desired transmitting frequency;
means for radiating said transformed frequency pulses and for receiving return signals; and
a single receiver channel means for processing said return signals, said recewiver channel means comprising a single serially arranged bandpass filter means;
a pulse compression means, for compressing said return signals, following said single receiver channel means and being in series arrangement therewith;
wherein each said pulse to be transmitted comprises two sub pulses, one of said sub pulses being substantially longer than the other one of said sub pulses, each sub pulse being coded with a different compression code, the compression code of the one sub pulse code having a low correlation property with the compression code of the other sub pulse, both said sub pulses having the same centre frequency;

whereby, said bandpass filter means has a bandpass sufficient to pass both said sub pulses;

said pulse compression means comprising a single pulse compressor having a first set of coefficients which correlates with one of said sub pulses and decorrelates with the other one of said sub pulses, and a second set of coefficients which correlates with the other one of said sub pulses; and means for switching said sets of coefficients into circuit one at a time, said means for switching being serially connected to said single receiver channel whereby to serially connect the sets of coefficients to said single receiver channels one at a time.

7. A system as defined in claim 6 wherein said means for generating frequency or phase code modulated pulses comprises a pulse generator unit having an output and a control input;

(A) and wherein said transmitting channel further comprises:

a first mixer having a first input, a second input and an output, and means connecting said output of said pulse generator unit to said first input of said first mixer;

a first local oscillator having a first output a second output and a control input, means connecting said first output of said first local oscillator to said second input of said first mixer;

a first bandpass filter having an input and an output, means connecting said output of said first mixer to said output of said bandpass filter;

a second mixer having a first input a second input and an output, means connecting said output of said first bandpass filter to said first input of said second mixer;

a second local oscillator having a first output and a second output, means connecting said first output of said second oscillator to said second input of said second mixer;

a second bandpass filter having an input and an output, means connecting said output of said second mixer to said input of said second bandpass filter;

(B) said antenna means comprising:

a duplexer means having a first input, a second input, a first output and a second output, means connecting said output of said second bandpass filter to said first input of said duplexer means;

an antenna having a first input and a first output, means connecting said first output of said duplexer means to said input of said antenna, means connecting said output of said antenna to said second input of said duplexer means;

(C) said receiver channel means comprising:

a low noise amplifier having an input and an output, means connecting said second output of said duplexer means to said input of said noise amplifier;

a third bandpass filter having an input and an output, means connecting said input of said third bandpass filter to said output of said noise amplifier;

a third mixer having a first input, a second input and an output, means connecting said output of said third bandpass filter to said first input of said third mixer, means connecting said second output of said second local oscillator to said second input of said third mixer;

a fourth bandpass filter having an input and an output, means connecting said output of said third mixer to said input of said fourth bandpass filter;

a fourth mixer having a first input, a second input and an output, means connecting said output of said fourth bandpass filter to said first input of said fourth mixer, means connecting said second output of said first local oscillator to said second input of said fourth mixer;

a fifth bandpass filter having an input and an output, means connecting said output of said fourth mixer to said input of said fifth bandpass filter;

analogue-to-digital converter and demodulator means having an input and an output, means connecting said output of said fifth bandpass filter to said input of said analogue-to-digital converter and demodulator means;

a pulse compressor unit having an input and control input, means connecting said output of said analogue-to-digital converter and demodulator means to said input of said pulse compressor unit;

(D) said system timing and control unit comprising:

a system timer and controller having a first output, a second output and a third output, said first output of said system timer and controller being connected to the control input of said pulse generator unit, said second output of said system timer and controller being connected to the control input of said first local oscillator, and said third output of said system timer and controller being connected to the control input of said pulse compresso unit.

* * * * *